(12) United States Patent
Srinivasan

(10) Patent No.: US 7,596,198 B1
(45) Date of Patent: Sep. 29, 2009

(54) OVER TEMPERATURE AND OVER POWER DELTA TEMPERATURE OPERATING MARGIN RECOVERY METHOD AND REACTOR SYSTEM EMPLOYING THE SAME

(75) Inventor: Jagannathan Seenu Srinivasan, Murrysville, PA (US)

(73) Assignee: Westinghouse Electric Co LLC, Cranberry, PA (US)

( * ) Notice: Subject to any disclaimer, the term of this patent is extended or adjusted under 35 U.S.C. 154(b) by 231 days.

(21) Appl. No.: 11/367,001

(22) Filed: Mar. 2, 2006

Related U.S. Application Data

(60) Provisional application No. 60/667,320, filed on Apr. 1, 2005.

(51) Int. Cl.
*G21C 17/00* (2006.01)
(52) U.S. Cl. ............... 376/247; 376/245; 376/259; 376/215
(58) Field of Classification Search .......... 376/247, 376/245, 259, 215
See application file for complete search history.

(56) References Cited

U.S. PATENT DOCUMENTS

| 4,222,822 A | 9/1980 | Mueller et al. |
| 5,024,802 A | 6/1991 | Srinivasan |
| 5,253,190 A | 10/1993 | Srinivasan |
| 5,373,539 A | 12/1994 | Impink, Jr. et al. |

*Primary Examiner*—Rick Palabrica

(57) ABSTRACT

A method is provided for recovering operating margin in a nuclear reactor. The reactor includes a steam generator, a Reactor Coolant System (RCS) having a hot leg with a temperature, $T_{hot}$, and a cold leg with a temperature, $T_{cold}$, a Reactor Trip System (RTS) having an Over Temperature Delta Temperature (OTDT) trip function and an Over Power Delta Temperature (OPDT) trip function, and a control system. The method improves the RTS by filtering only the hot leg temperature signal of the RCS. Thus, the needs for separate $T_{avg}$ and Delta-T filters, and for filtering of temperature signals in both the hot leg and cold leg are eliminated. A reactor system is also disclosed.

5 Claims, 5 Drawing Sheets

OVER TEMPERATURE AND OVER POWER DELTA TEMPERATURE OPERATING MARGIN RECOVERY METHOD AND REACTOR SYSTEM EMPLOYING THE SAME

CROSS REFERENCE TO RELATED APPLICATION

This application claims the benefit of U.S. Provisional Application Ser. No. 60/667,320, filed Apr. 1, 2005 entitled "Over Temperature and Over Power Delta-T Operating Margin."

BACKGROUND OF THE INVENTION

1. Field of the Invention

The present invention relates generally to nuclear reactors and, more particularly, to an Over Temperature Delta Temperature and Over Power Delta Temperature operating margin recovery method for increasing the Over Temperature Delta Temperature and Over Power Delta Temperature setpoints of a nuclear Reactor Trip System thereby increasing the safe operating margin of the reactor. The invention further relates to a reactor system, such as the Reactor Trip System, employing an Over Temperature Delta Temperature, Over Power Delta Temperature recovery method.

2. Background Information

To ensure that the specified acceptable fuel design limits of a nuclear reactor, such as a pressurized water reactor (PWR), are not exceeded, a Reactor Trip System (RTS) is typically employed. The RTS is designed to automatically initiate the rapid insertion of the control rods, commonly referred to as the reactor scram function, of the reactivity control system by interrupting electrical power to the rod control system and allowing the control rods to fall by gravity into the reactor core. Generally, the RTS includes a variety of different devices (e.g., without limitation, power sources, sensors, communication links, software/firmware, initiation circuits, logic matrices, bypasses, interlocks, switchgear, actuation logic, and actuated devices) which are required to initiate a reactor trip. Using such devices, the RTS initiates a trip and shuts down the reactor when established setpoints are surpassed.

Among the reactor trip functions the RTS provides are, for example, core heat removal trips including, without limitation, an Over Power Delta Temperature (OPDT) trip, which is designed to effectuate a reactor trip in order to protect against excessive power (i.e., fuel rod rating protection), and an Over Temperature Delta Temperature (OTDT) trip. Conventionally, the OTDT and OPDT setpoints for such trips are calculated based upon dynamic compensations of measured temperature differences in both the hot leg and cold leg of the Reactor Coolant System (RCS), the average of hot leg and cold leg temperature, and the core power distribution in the core of the reactor. However, due to the method of measuring temperature in the hot leg and due to the temperature streaming in the hot leg, steady state temperature fluctuations exist which adversely challenge the OPDT and OTDT trip setpoints.

More specifically, several nuclear power plants have been known to experience aperiodic hot leg temperature ($T_{hot}$) fluctuations that originate, for example, in the reactor vessel upper plenum and wherein the temperature in the hot leg rapidly increases by about 1° F. to about 3° F. in a fast ramp up, remains at an elevated temperature for several seconds, and finally returns to the original temperature. Among other disadvantages, such temperature oscillations undesirably lead to a reduction in the OPDT or OTDT safe operating margin. In turn, this could result, for example, in a partial turbine runback, an actual turbine runback (i.e., when more than one channel is affected) or, in the extreme case, a reactor trip. Such hot leg temperature fluctuations are attributed to the aforementioned hot leg flow streaming phenomenon of the Reactor Coolant System (RCS). Such flow streaming adversely impacts the measured RCS average temperature, which is often used as an input to the Rod Control System and, therefore, can cause spurious control rod stepping when the Rod Control System is in automatic mode. In order to avoid such rod stepping, several power plants have been forced to operate in manual rod control mode. Additionally, in an attempt to accommodate the aforementioned fluctuations, a plurality of filters have been required to be employed in the RTS in order to provide filtering functions in both the cold and hot legs, and after the average temperature has been obtained for both legs.

There is a need, therefore, for a modification of protection functions of the RTS and, in particular, of the Over Power Delta Temperature (OPDT) and Over Temperature Delta Temperature (OTDT) trip functions.

There is, therefore, room for improvement in OPDT and OTDT operating margin recovery methods and in reactor systems employing the same.

SUMMARY OF THE INVENTION

These needs and others are met by the present invention, which is directed to an Over Pressure Delta Temperature (OPDT), Over Temperature Delta Temperature (OTDT) operating margin recovery method.

As one aspect of the invention, a method is provided for recovering operating margin in a nuclear reactor. The nuclear reactor has a core temperature and a core power distribution and includes a steam generator, a Reactor Coolant System (RCS) having a hot leg with a temperature, $T_{hot}$, and a cold leg with a temperature, $T_{cold}$, a Reactor Trip System (RTS) having an Over Temperature Delta Temperature (OTDT) trip function and an Over Power Delta Temperature (OPDT) trip function, and a control system. The method comprises: measuring a temperature in the hot leg of the RCS and providing hot leg temperature signal representative thereof; filtering the hot leg temperature signal to smooth signal perturbations resulting from temperature fluctuations; measuring a temperature in the cold leg of the RCS and providing an unfiltered cold leg temperature signal representative thereof; establishing an OTDT setpoint for the RTS from the filtered hot leg temperature signal and the unfiltered cold leg temperature signal; establishing an OPDT setpoint for the RTS from the filtered hot leg temperature signal and the unfiltered cold leg temperature signal; measuring at least one of the core temperature and power distribution of the nuclear reactor; comparing the measured core temperature to the OTDT setpoint; comparing the measured core power distribution to the OPDT setpoint; and tripping the nuclear reactor when either the measured core temperature or the core power distribution of the reactor respectively exceeds the OTDT or OPDT setpoint.

The method may further comprise sending a trip signal to the reactor control system in order to initiate a reactor trip when the measured core temperature exceeds the OTDT setpoint, and/or sending a trip signal to the reactor control system in order to initiate a reactor trip when the measured core power distribution exceeds the OPDT setpoint. The method may also comprise providing a single filter in the hot leg of the RCS, and employing the single filter to perform the step of smoothing signal perturbations resulting from temperature fluctuations only in the hot leg of the RCS. Accordingly, the previously known requirements of providing separate $T_{avg}$ and Delta-T filters and of filtering in both the hot leg and the cold leg may be eliminated.

The method may include the steps of isolating the hot leg and cold leg temperatures, $T_{hot}$, $T_{cold}$, for use in the OTDT and OPDT functions, and providing separate dynamic compensations for the OTDT and OPDT functions based upon the values of the isolated $T_{hot}$ and $T_{cold}$.

As another aspect of the invention, a reactor system is provided for a nuclear reactor having a core temperature and a power distribution. The reactor system comprises: a steam generator; a RCS including a hot leg with a temperature, $T_{hot}$, and a cold leg with a temperature, $T_{cold}$, at least the hot leg being in fluid communication with the steam generator; and a filter. The reactor system is adapted to measure a temperature in the hot leg of the RCS and provide a hot leg temperature signal representative thereof, filter the hot leg temperature to smooth temperature perturbations resulting from temperature fluctuations, measure a temperature in the cold leg of the RCS and provide an unfiltered temperature signal representative thereof, establish a first trip setpoint for the nuclear reactor from the filtered hot leg temperature signal and the unfiltered cold leg temperature signal, establish a second trip setpoint for the nuclear reactor from the filtered hot leg temperature signal and the unfiltered cold leg temperature signal, measure the core temperature and the power distribution of the nuclear reactor, compare the measured core temperature to the first trip setpoint, compare the measured core power distribution to the second trip setpoint, and trip the nuclear reactor when either the measured core temperature or the core power distribution respectively exceeds the first trip setpoint or the second trip setpoint.

The filter may comprise a single filter disposed in the hot leg of the RCS and being structured to provide the filtering to smooth signal perturbations due to temperature fluctuations in only the hot leg of the RCS. Use of the single filter disposed in the hot leg only may eliminate the requirement of providing separate $T_{avg}$ and Delta-T filters in the RCS and the requirement of filtering in both the hot leg and the cold leg.

The reactor system may be a RTS including an OTDT trip function and an OPDT trip function. The first trip setpoint may be an OTDT setpoint for the RTS and the second trip setpoint may be an OPDT setpoint for the RTS. The RTS may include a first comparator for comparing the measured core temperature to the OTDT setpoint, and a second comparator for comparing the measured core power distribution to the OPDT setpoint. The nuclear reactor may include a reactor control system and the RTS may be adapted to send a trip signal to the reactor control system in order to initiate a reactor trip when the measured core temperature exceeds the OTDT setpoint, and/or to send a trip signal to the reactor control system in order to initiate a reactor trip when the measured power distribution exceeds the OPDT setpoint.

The RTS may also be structured to isolate the temperatures, $T_{hot}$, $T_{cold}$, of the hot leg and cold leg for use in the OTDT and OPDT functions and, based upon the values of the isolated $T_{hot}$ and $T_{cold}$, to provide separate dynamic compensations for the OTDT and OPDT functions.

The nuclear reactor may be a pressurized water reactor and the reactor system may be a Reactor Trip System structured to trip the pressurized water reactor when one of the first trip setpoint and the second trip setpoint is exceeded.

BRIEF DESCRIPTION OF THE DRAWINGS

A full understanding of the invention can be gained from the following description of the preferred embodiments when read in conjunction with the accompanying drawings in which:

DESCRIPTION OF THE PREFERRED EMBODIMENTS $T_{avg}$ and Delta-T Filtering in Both the Hot Leg and the Cold Leg FIG. 1 shows, in simplified form, a pressurized water nuclear reactor (PWR) 2 and a hot leg fluid temperature measurement assembly 4 for the steam generator 6 thereof. Generally, the reactor 2 receives water over line 8 and heats the water, which exits the reactor 2 on another line 10, known as the hot leg. The hot leg 10 is shown in FIG. 1 in enlarged simplified, cross-sectional form to illustrate three sensors A, B, C which are disposed on a circular plane normal to the direction of fluid flow in the line. The sensors A, B, C, which comprise, for example, thermocouples or any other known or suitable thermally responsive resistance devices, are coupled to a processor 12 by leads A1, B1, C1. In the example of FIG. 1, the processor 12 includes a memory unit 14 and a display 16 for indicating temperatures $T_A$, $T_B$, $T_C$ (not expressly shown) which are provided by sensors A, B, C, respectively. In an attempt to reduce the bias or offset error in the aggregate measured temperature in the hot leg 10 to a repeatable value, it is known to assign different weighing factors to $T_A$, $T_B$, $T_C$ based upon their relative magnitudes. For instance, assuming $T_A$ produces the lowest measured temperature, it receives a smaller weighting value such that if the weighting factor for $T_A$ is 20 percent, the weighting factors for $T_B$ and $T_C$ are each 40 percent. In this manner, a 20 percent factor is assigned to the noisiest sensor (i.e., $T_A$), and the error is 20 percent of the sum of the offsets of the other two sensors, $T_B$ and $T_C$. This error can be accounted for in the analysis or in scaling. Thus, by assigning only 20 percent weighted value to the noisiest sensor, the impact of the temperature fluctuation can be reduced and operating margins can be increased. The foregoing method and system are generally well known and are described in further detail in U.S. Pat. No. 5,253,190.

While the foregoing marks an advancement in the art with respect to measurement of the temperature of fluid in the hot leg 10 of the steam generation system 6, there remains a real and recognizable need for further improvement in the establishment of setpoints for the Reactor Trip System (RTS) and, in particular, in the recovery of reactor operating margin by improving the system and method for establishing the Over-Temperature Delta Temperature (OTDT) and Over-Power Delta Temperature (OPDT) trip setpoints.

Figure 1:
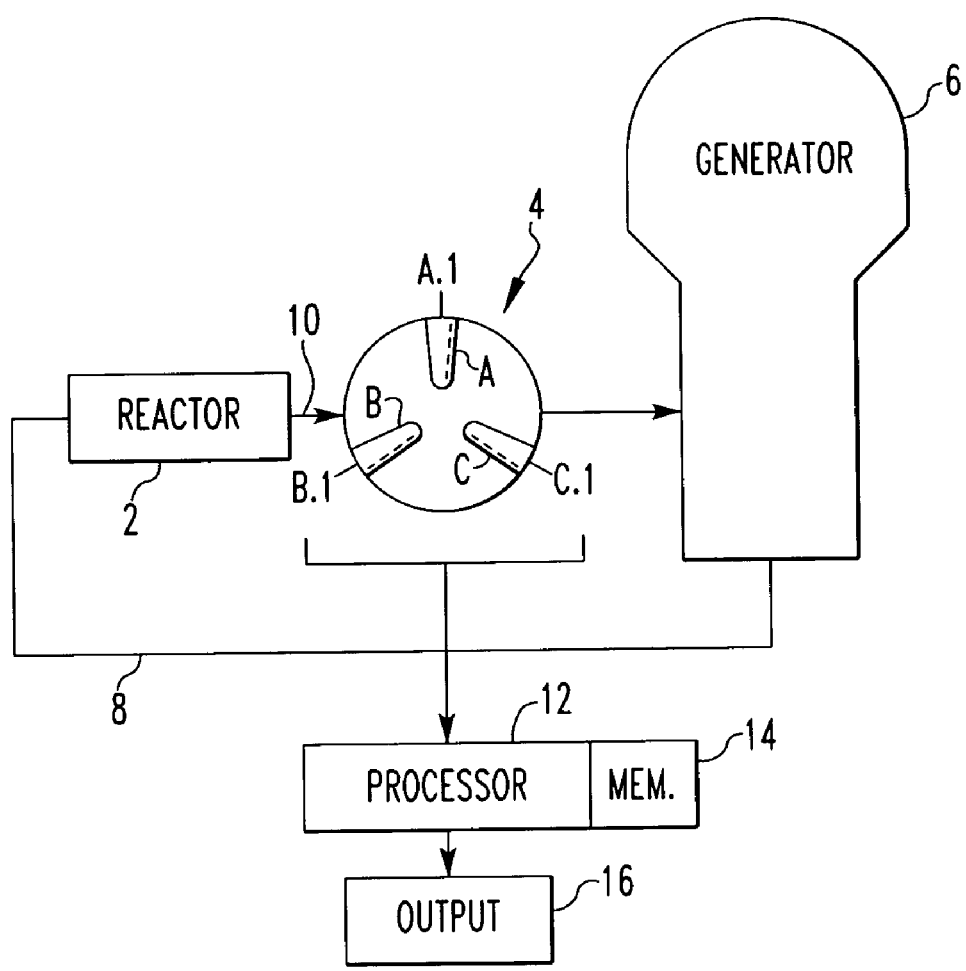
FIG. 1 is a schematic diagram of a known steam generation system for a pressurized water nuclear reactor, and a method for measuring the temperature in the hot leg thereof.
Figure 2:
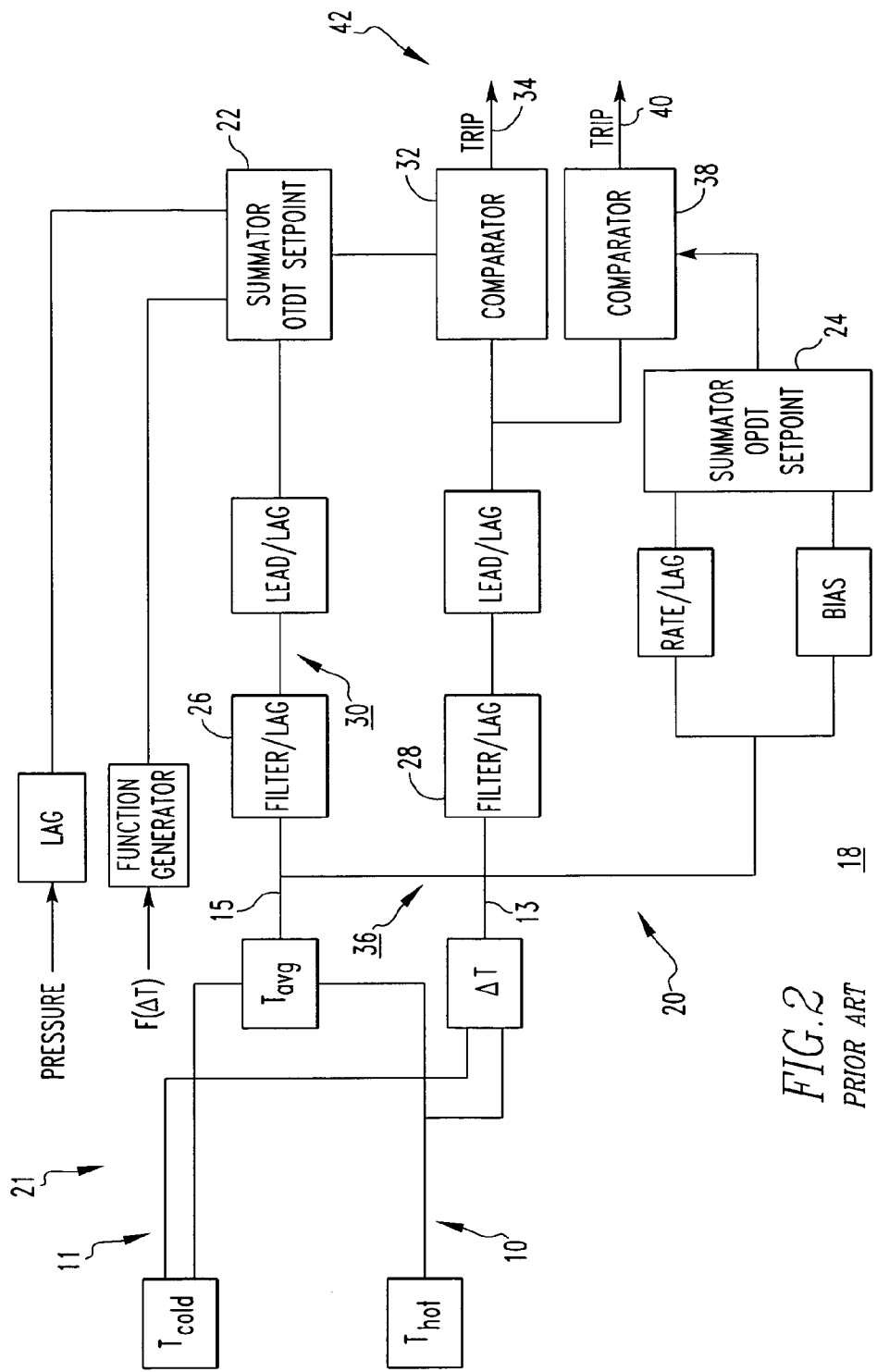
FIG. 2 is a simplified schematic flow chart depicting a portion of a Reactor Trip System (RTS) and method using two filters for determining the Over Temperature Delta Temperature (OTDT) and Over Power Delta Temperature (OPDT) setpoints for the steam generation system of FIG. 1.

In FIG. 2, a known method or control scheme 18 and a portion of the RTS 20 is shown in simplified form. As previously discussed, OTDT and OPDT setpoints 22, 24 are currently calculated based upon dynamic compensations of the average of the hot leg and cold leg temperature, $T_{avg}$, and the core power distribution (not shown) in the core of the reactor 2 (FIG. 1).

In operation, the OTDT setpoint 22 is generated by the setpoint circuit generally illustrated by reference character 30 in FIG. 2. The OTDT setpoint 22 is also impact by the pressue and F-Delta-T signals. Comparator 32 then compares the reactor core temperature (i.e., the cold and hot leg temperature difference) or Delta-T in the temperature output signal 13 of hot leg 10 and the temperature output signal 15 of cold leg 11 of the RCS 21 to the OTDT setpoint 22 that was generated by circuit 30. If the Delta-T is exceeded, a trip signal 34 is issued to the reactor control system (indicated generally in FIG. 2 by reference character 42) to inhibit movement (i.e., withdrawal) of the control rods (not shown) and/or to initiate a reactor trip. Similarly, the OPDT setpoint 24 is implemented by the setpoint circuitry generally illustrated by reference character 36 in FIG. 2. In this circuit 36, the core power distribution is measured by Delta-T and any peaks in power are noted and compared to OPDT setpoint 24 by comparator 38. If the Delta-T exceeds the OPDT setpoint, trip signal 40 is generated to stop further control rod movement and/or to initiate a reactor trip depending on the severity with which the setpoint 24 was surpassed.

Due to the aforementioned method of measuring temperature in the hot leg 10, discussed previously in connection with FIG. 1, and to temperature streaming (i.e., temperature signal perturbations due to such things as, for example, stratification, and mixing, which can result in differences and fluctuations in temperature readings at different radial locations in the same longitudinal location of the fluid line) and other fluid flow phenomenon in the hot leg 10 associated therewith, steady state temperature fluctuations occur which adversely affect (i.e., reduce) the OTDT and OPDT setpoints 22, 24. Furthermore, filters 26, 28 are required to filter and smooth out signal perturbations resulting from these temperature fluctuations and thereby resist the decrease of setpoints 22, 24. As shown in FIG. 2, the existing RCS 20 requires at least two separate filters 26, 28. Specifically, filter 26 is required to perform $T_{avg}$ signal filtering and a second filter 28 is required to perform Delta-T signal filtering, in order to accommodate the aforementioned adverse temperature fluctuations. Such known dual filtering is performed in both the hot and cold legs 10, 11 of the RCS 21 and results in the OTDT and OPDT trip margin recovery. However, this dual filtering will take place even if there is a change in the cold leg 11, thus disadvantageously impacting (i.e., reducing) the reactor safety margin in accordance with the RTS 20. The present invention provides a method 118 and Reactor Trip System (RTS) 120 which overcomes these disadvantages and thereby serves to improve (i.e., increase) the OTDT and OPDT trip function setpoints 122, 124 and regain valuable operating margin while not impacting the safety margin.

Hot Leg Only Filtering and OTDT, OPDT Operating Margin Recovery

Figure 3:
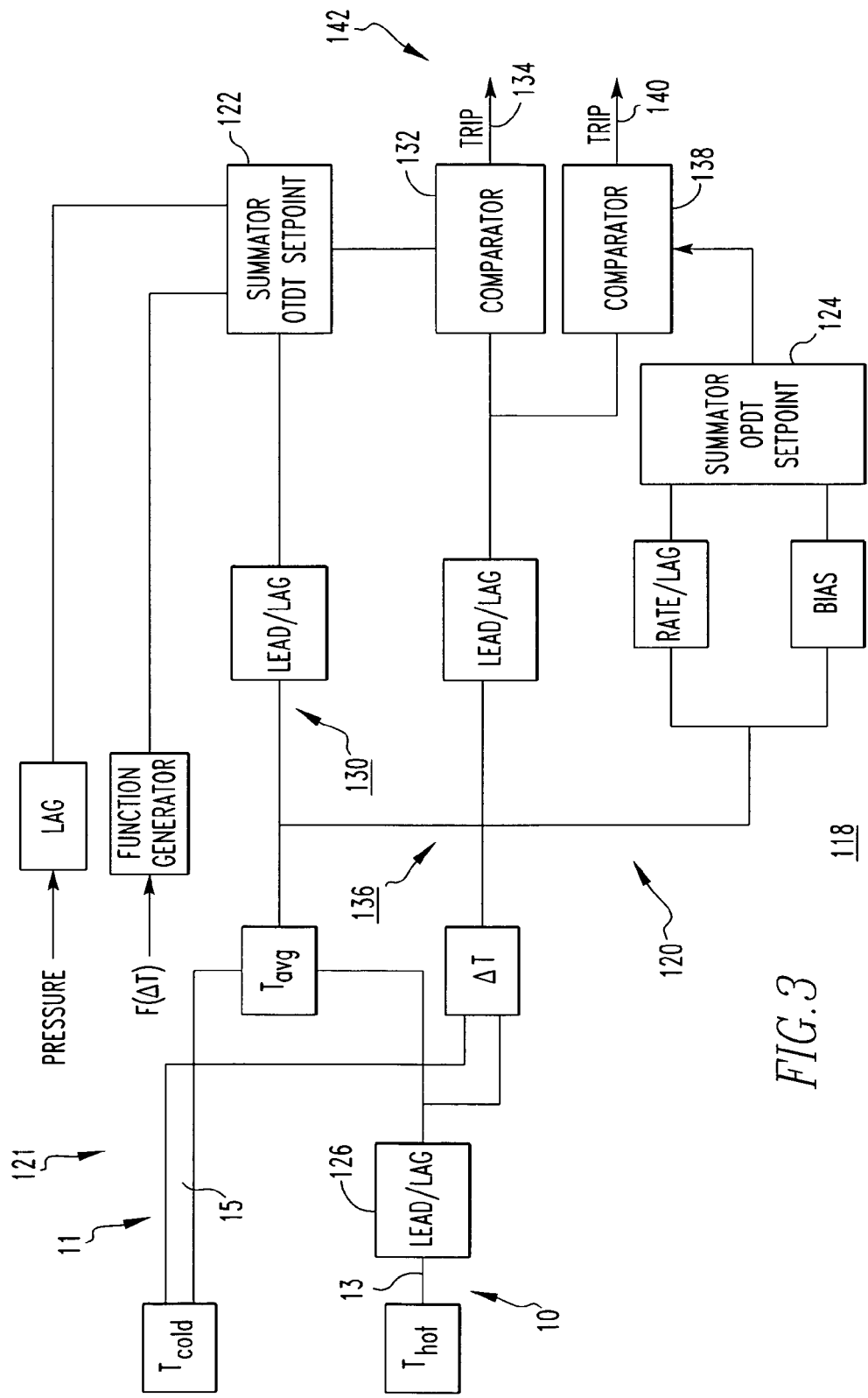
FIG. 3 is a simplified schematic flow chart illustrating an OTDT and OPDT operating margin recovery method and a portion of a Reactor Trip System (RTS) employing a single filter in the hot leg only, in accordance with the present invention.

As shown in FIG. 3, the present invention provides an OTDT and OPDT operating margin recovery method 118 and RTS 120 wherein filtering to accommodate undesirable temperature fluctuations is performed in only the hot leg 10, through use of a single filter 126. Specifically, a low-pass filter having a variable time constant of, for example and without limitation, from about one to about four seconds is introduced on the hot leg 10. Additionally, it is an object of the invention to isolate the hot and cold leg temperatures, $T_{hot}$ and $T_{cold}$, and temperature signals 13, 15 associated respectively therewith, to be used in the OTDT and OPDT channels or circuits 130, 136 separately. Specifically, in accordance with the existing filtering scheme of FIG. 2 the cold leg 11 temperature changes due, for example, to an event such as, for example and without limitation, a steambreak, the magnitude of Delta-T is filtered and reduced (see, for example, the Delta-T plot and, in particular, the first spike, shown in solid line drawing in FIG. 4). Conversely, in accordance with the proposed filtering scheme of FIG. 3, the change in cold leg 11 temperature will impact the Delta-T (see, for example, the Delta-T plot shown in solid line drawing in FIG. 5) and the $T_{hot}$ filter will not change the Delta-T signal or the OPDT (see, for example, the margin plot shown in solid line drawing in FIG. 7) and thus, a reactor trip will occur as required, thereby protecting the reactor core as intended. Accordingly, the proposed filtering scheme and method of the invention, shown in FIG. 3, advantageously enables separate dynamic compensations for the hot leg temperature fluctuations that will not impact the OPDT trip functions.

Filtering only $T_{hot}$ temperature signal 13 is also beneficial, for example, during the load rejection transients without impacting the Departure from Nucleate Boiling Ratio (DNBR) margin. Specifically, during load rejections, the temperature in the cold leg 11 increases first, and the core Delta-T decreases. When a filter in accordance with the invention is present in the hot leg 10, the decrease in Delta-T is more pronounced. Hence, a gain or recovery of operating margin is achieved. It has been noted that these load rejections may be between about 10% to about 50%, and are generally bounded by the loss of load transient in the safety analysis. If the proposed modification in accordance with the invention is employed, then for plants where the load rejection is less than about 50%, it is anticipated that the plant will be able to ride through the transient without challenging any safety systems. Moreover, hot leg only filtering in accordance with the invention has minimal impact on the safety criteria and the Final Safety Analysis Report (FSAR) analysis.

Implementing filtering in only the hot leg 10 of the RCS 120 arrests (i.e., minimizes) the decrease of the OTDT and OPDT setpoints 122, 124 during steady state hot leg 10 temperature fluctuations, and thus optimizes reactor operating margin. Specifically, the T-avg increases slowly when the T-Hot filter 126 is employed, which in turn results in the setpoint decreasing slowly. Accordingly, known adverse challenges to OTDT/OPDT trip functions, such as temperature streaming and signal and temperature fluctuations are minimized by T-hot filtering only, in accordance with the invention.

More specifically, comparing FIG. 3 to FIG. 2, it will be appreciated that a single filter 126 is implemented only in hot leg 10, replacing the previously required separate filters 26, 28 needed for $T_{avg}$ and Delta-T filtering in both the hot and cold legs 10, 11 and thereby greatly simplifying the control scheme or operating margin recovery method 118. By eliminating the requirement for separate $T_{avg}$ and Delta-T filtering in the setpoint circuits 130, 136 of the RCS 120, there is significantly less erosion of the available reactor operating margin. This is, in part, because every time additional filtering is undertaken, the setpoints 122, 124 are necessarily lowered and the operating margin decreased. In other words, by eliminating the $T_{avg}$ and Delta-T filters 26, 28 (FIG. 2), the OTDT and OPDT setpoints 122, 124 are set at a higher value and, therefore, the reactor operating margin is greater. Accordingly, the invention minimizes the occurrence of highly undesirable interruptions in reactor operations resulting, for example, from marginal over temperature or over power transients, which never jeopardized the safe operation of the reactor, but which nonetheless previously triggered the RTS 20 (FIG. 2) because established OTDT and OPDT setpoints 22, 24 were low, and were easily exceeded. The higher OTDT and OPDT setpoints 122, 124 provided by the method and system of the invention result in the recovery of substantial reactor operating margin. Specifically, trip signals 134, 140 are prompted to trigger reactor control system 142 to initiate a reactor trip less frequently.

In summary, as shown in FIGS. 4, 5, 6 and 7, the T-hot filtering scheme of the invention (1) does not undesirably filter or alter (i.e., reduce) the Delta-T fluctuation magnitude and, therefore, does not require a change in the plant safety analysis; and (2) reduces (i.e., minimizes) the amount of decrease in the OTDT/OPDT setpoints 122, 124, thus increasing the operating margin in comparison to the prior proposal (FIG. 2).

The benefits and advantages of the method and system of the invention can be more fully understood with reference to the following EXAMPLE. The EXAMPLE is provided to illustrate but one example of the reactor operating margin recovery afforded by the invention, and is not limiting upon the scope of the invention in any way.

EXAMPLE

For the EXAMPLE, hot leg only filtering, in accordance with the invention, was performed on a representative nuclear reactor plant model and compared to the known dual, $T_{avg}$ and Delta-T filtering method, previously discussed. For the EXAMPLE, the filter variable time constant value was about four seconds for the hot leg only filter 126 (FIG. 3), and about four seconds on both the $T_{avg}$ and Delta-T filters 26, 28 (FIG. 2). It will be appreciated, however, that the exemplary four second time constant represents but one possible example, offered solely for purposes of illustration, and that any suitable alternative filter time constant ranging, for example and without limitation, from about one second to about 10 seconds, could alternatively be employed.

A number of parameters were then compared and the following results were realized:
1. Load Rejection Analysis: the $T_{hot}$ only filter 126 of the invention provided about 2-3 percent more load rejection capability than the existing $T_{avg}$, Delta-T filters 26, 28 of the known RTS 20 (FIG. 2). For example, with the existing filtering scheme, if the plant can ride through a 36% to 37% load rejection form 100% with the proposed T-hot only filtering, then in accordance with the invention, the plant would be able ride through a 39% to 40% load rejection without a reactor trip.
2. Steam Line Break (SLB) at 100% Power Analysis: $T_{hot}$ only filtering in accordance with the invention provided about 4-5 percent more power peak than the existing system 20 (FIG. 2) and hence, providing the safety margin.
3. Steady State Fluctuations: the exemplary operating margin recovery method 118 provided substantially the same operating margin gain as if $T_{avg}$ and Delta-T filtering were provided, thereby illustrating the efficiency of the individual $T_{hot}$ filter 126 and method 118 of the invention.
4. Rod Withdrawal at Power (RWAP) Transients: the results for the RWAP transient analysis, may become more limiting with respect to the minimum DNBR with T-hot only filtering. However, by optimizing the time constant of the filter 126 in hot leg 10, the safety margin can be maintained. Moreover, any difference is far outweighed by the advantages of the exemplary single filter system 120 and method 118 of the invention, as described hereinabove.
5. Rod Control System Impact: $T_{hot}$ only filtering, in accordance with the invention provided better rod control because the $T_{avg}$ is used for the control system. Using the filters in the hot leg 10 in accordance with the invention reduces the $T_{avg}$ fluctuations and thus reduces the rod movements.

Accordingly, the foregoing EXAMPLE, clearly demonstrates that the invention provides an improved OTDT/OPDT operating margin recovery method 118 and reactor system 120, which among other advantages, eliminate the requirement of having two separate $T_{avg}$ and Delta-T filtering processes by utilizing $T_{hot}$ filtering only. Additionally, the invention improves the OTDT and OPDT trip functions and, in particular, increases the OTDT and OPDT trip setpoints 122, 124 resulting in the recovery of valuable reactor operating margin (e.g., up to about three percent or more).

The foregoing advantages offered by the invention, and in accordance with the aforementioned EXAMPLE, will be still further understood and appreciated with reference to FIGS. 4-7 which provide graphical comparisons of the Delta-T and Margin to OPDT, respectively, of the existing $T_{avg}$ and Delta-T filtering scheme previously shown and described with respect to FIG. 2, compared to the improved T-hot filtering system and method of the invention, shown in FIG. 3. It will be appreciated that the graphs are provided solely for simplicity of illustration and are not meant to be limiting upon the scope of the invention.

Figure 4:
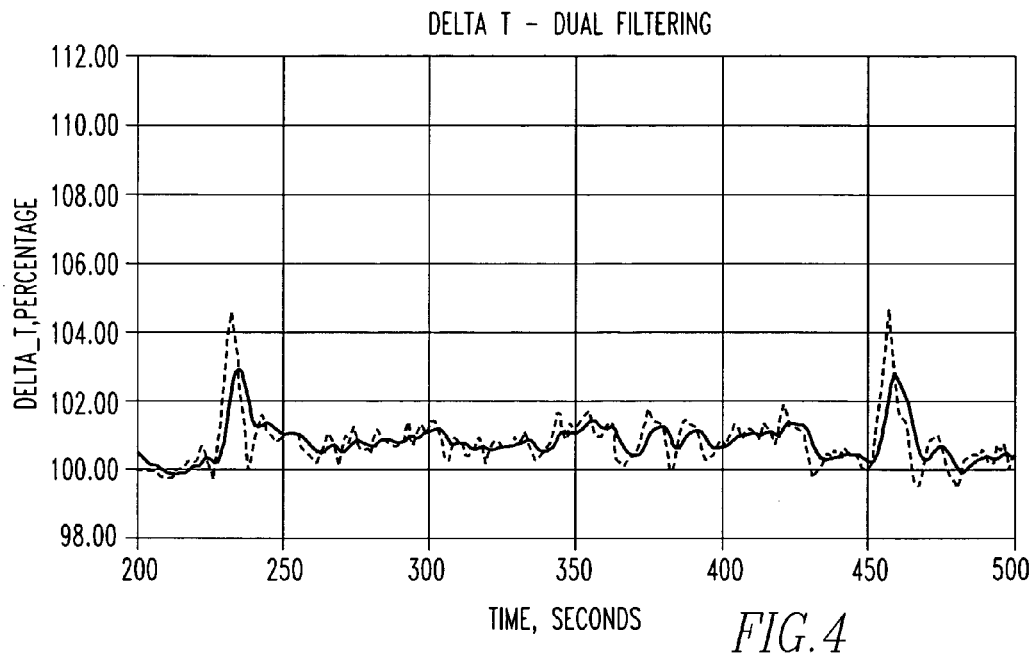
FIG. 4 is a graph of an example comparison of the Delta-T resulting from the method of FIG. 2, shown in solid line drawing, compared to the measured Delta-T, shown in dashed line drawing.
Figure 5:
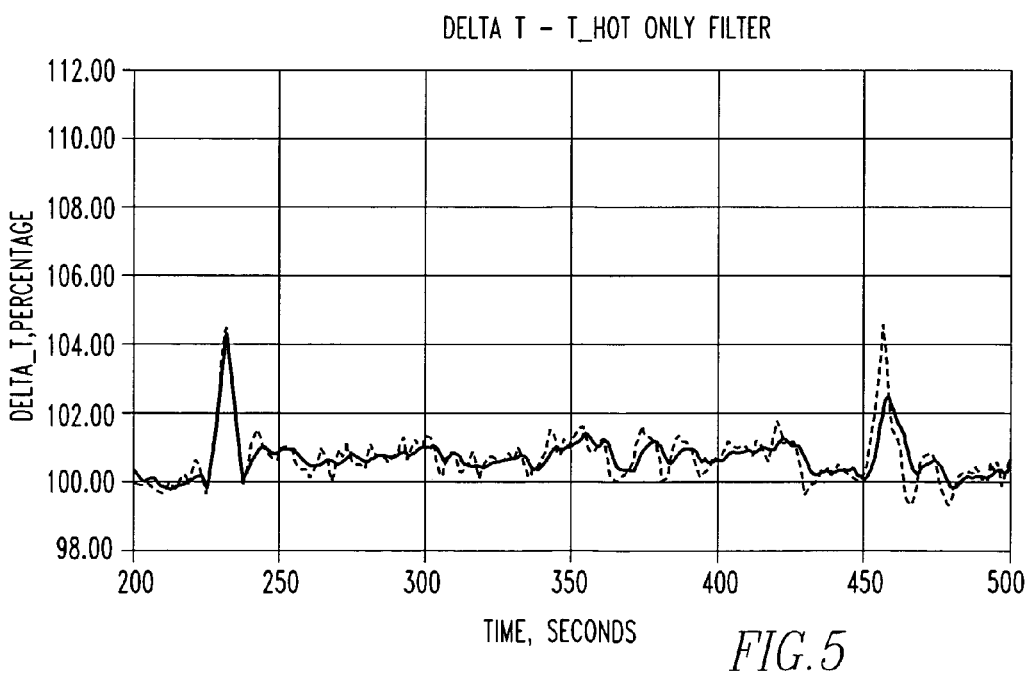
FIG. 5 is a graph having the same parameters as that of FIG. 4, but showing an example comparison of the Delta-T resulting from the method of FIG. 3 in accordance with the invention, shown in solid line drawing, compared to the measured Delta-T, shown in dashed line drawing.

FIG. 4 shows a plot comparing the Delta-T fluctuations experienced by the known method and filtering system shown in FIG. 2 in response to a steamline break condition, with the solid line representing the Delta-T in accordance with existing filtering system, and the dashed line representing the measured Delta-T for the same event. The first Delta-T increase (i.e., spike or peak) is due to T-Cold fluctuation. The second peak is due to T-hot fluctuation. The method of FIG. 2 filters both, as shown. However, as shown in FIG. 5, in accordance with the improved filtering system and method of the invention, the first spike will not be filtered (see, for example, the solid line drawing of FIG. 5), and the second spike will be attenuated. The comparison was conducted for a duration of 300 seconds, with the filters in both systems having the same time constant of about four seconds, and the lead/lag values being set at 3/3. As shown, the traditional filtering scheme (FIG. 2) results in the Delta-T fluctuation magnitude being filtered and reduced significantly for both spikes, whereas filtering only in the hot leg in accordance with the invention (FIG. 3) generally did not result in a change of the Delta-T fluctuation magnitude for the first spike. This confirms the fact that the invention provides a system and method which accurately reflects the full spectrum of the affect of a transient condition, such as the steamline break, shown, such that the reactor will trip, as intended. Conversely, the Delta-T fluctuation magnitude in accordance with the existing method, for the first spike shown in solid line drawing in FIG. 4, is substantially reduced, thereby requiring a change to be made in the plant safety analysis in order ensure that the reactor trips, as intended.

Figure 6:
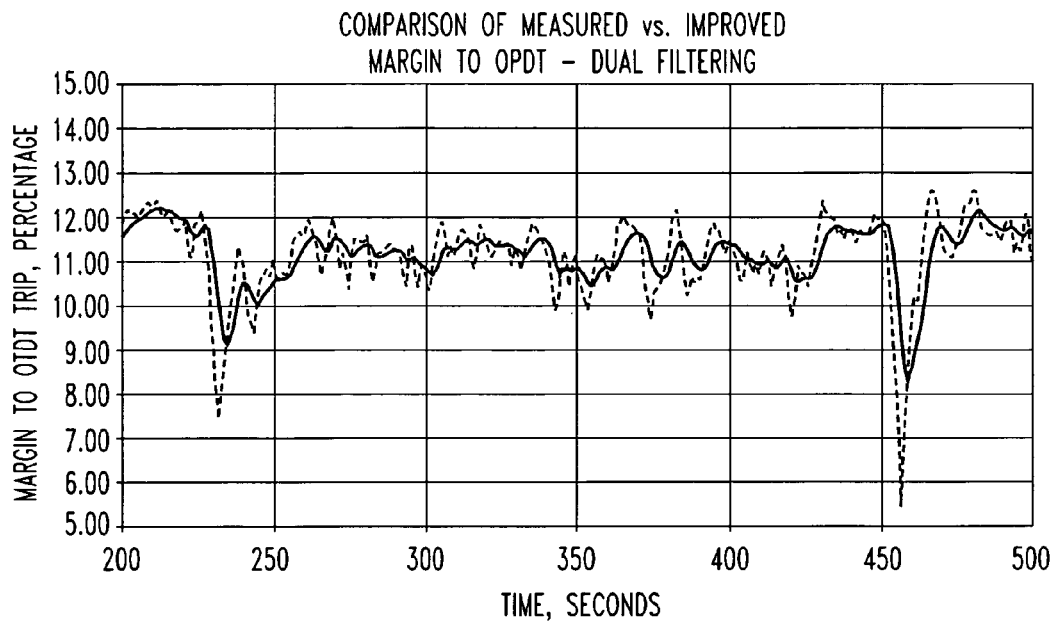
FIG. 6 is a graph of an example comparison of the margin to OPDT trip for the RTS and method of FIG. 2, shown in solid line drawing, compared to the measured margin to OPDT trip for the RTS, shown in dashed line drawing.
Figure 7:
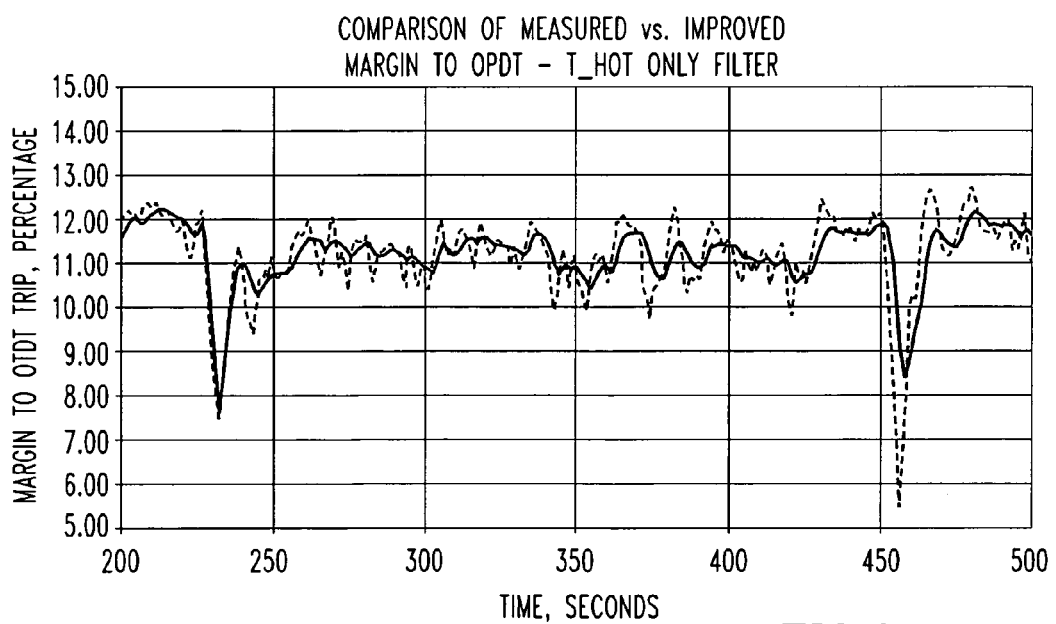
FIG. 7 is a graph of an example comparison of the margin to OPDT trip for the RTS and method of FIG. 3, shown in solid line drawing, compared to the measured margin to OPDT trip for the RTS, shown in dashed line drawing.

FIGS. 6 and 7 illustrate an example of the aforementioned improvement in the RTS setpoints offered by the present invention. The system parameters for the plot of FIGS. 6 and 7 were substantially similar to those discussed in connection with FIGS. 4 and 5. Specifically, FIG. 6 compares the margins to OPDT trip for the existing filtering scheme of FIG. 2. As shown with reference to the dashed line drawing, the measured margin is increased for both spikes, shown in solid line drawing. However, as shown in FIG. 7 in solid line drawing, in accordance with the method of the invention (FIG. 3), there was no increase in the margin for the first spike, compared to the measured margin to OPDT trip. Thus, the same safety margin is maintained.

Accordingly, the invention provides a number of benefits including, without limitation, the recovery of up to about three percent OPDT and OTDT operating margin when the fluctuations are due to $T_{hot}$ fluctuation, no margin recovery for the OPDT when the fluctuations are due to T-cold fluctuation, the accommodation of temperature fluctuations without turbine runbacks, reduced challenges to reactor safety systems, minimized rod stepping (when operating in automatic rod control), and the ability to support more aggressive fuel management due to the additional operating margin.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method for recovering operating margin in a nuclear reactor, the nuclear reactor including a steam generator, a Reactor Coolant System having a hot leg with a temperature, $T_{hot}$, and a cold leg with a temperature, $T_{cold}$, a Reactor Trip System having an Over Temperature Delta Temperature trip function and an Over Power Delta Temperature trip function, and a control system, the method comprising:

measuring a temperature in the hot leg of the Reactor Coolant System and providing a hot leg temperature signal representative thereof;

filtering the hot leg temperature signal to smooth signal perturbations resulting from temperature fluctuations;

measuring a temperature in the cold leg of the Reactor Coolant System and providing an unfiltered cold leg temperature signal representative thereof;

establishing an Over Temperature Delta Temperature setpoint for the Reactor Trip System from the filtered hot leg temperature signal and the unfiltered cold leg temperature signal;

establishing an Over Power Delta Temperature setpoint for the Reactor Trip System from the filtered hot leg temperature signal and the unfiltered cold leg temperature signal;

measuring the difference between the filtered hot leg temperature signal and the unfiltered cold leg temperature signal;

comparing the measured difference between the filtered hot leg temperature signal and the unfiltered cold leg temperature signal to said Over Temperature Delta Temperature setpoint;

comparing the measured difference between the filtered hot leg temperature signal and the unfiltered cold leg temperature signal to said Over Power Delta Temperature setpoint; and tripping the nuclear reactor when the measured difference between the filtered hot leg temperature signal and the unfiltered cold leg temperature signal exceeds the Over Temperature Delta Temperature setpoint or the Over Power Delta Temperature setpoint.

2. The method of claim 1 wherein:
tripping the nuclear reactor includes sending a trip signal to the reactor control system in order to initiate the reactor trip.

3. The method of claim 1 further comprising:
providing a single filter in the hot leg of said Reactor Coolant System; and
employing said single filter to perform said step of smoothing signal perturbations resulting from temperature fluctuations only in the hot leg of said Reactor Coolant System.

4. The method of claim 1 further comprising:
isolating the hot leg and cold leg temperatures, $T_{hot}$, $T_{cold}$, for use in the Over Temperature Delta Temperature and Over Power Delta Temperature functions; and
providing separate dynamic compensations for the Over Temperature Delta Temperature and Over Power Delta Temperature functions based upon the values of said isolated $T_{hot}$ and $T_{cold}$.

5. The method of claim 1 wherein said nuclear reactor is a pressurized water reactor.

* * * * *